US012722333B2

(12) United States Patent
Lin et al.

(10) Patent No.: US 12,722,333 B2
(45) Date of Patent: Sep. 1, 2026

(54) HOUSING AND METHOD FOR MANUFACTURING THE SAME

(71) Applicant: LITE-ON TECHNOLOGY CORPORATION, Taipei (TW)

(72) Inventors: Yen-Chen Lin, Taipei (TW); Chih-Min Li, Taipei (TW); Cheng-Nan Chen, Taipei (TW)

(73) Assignee: LITE-ON TECHNOLOGY CORPORATION, Taipei (TW)

(*) Notice: Subject to any disclaimer, the term of this patent is extended or adjusted under 35 U.S.C. 154(b) by 240 days.

(21) Appl. No.: 18/422,040

(22) Filed: Jan. 25, 2024

(65) Prior Publication Data

US 2025/0144860 A1 May 8, 2025

(30) Foreign Application Priority Data

Nov. 6, 2023 (TW) ................................ 112142676

(51) Int. Cl.

| | |
|---|---|
| ***G06F 1/16*** | (2006.01) |
| ***B29C 45/12*** | (2006.01) |
| ***B29C 45/17*** | (2006.01) |
| ***B29C 45/26*** | (2006.01) |
| ***B29C 45/66*** | (2006.01) |
| *B29L 31/00* | (2006.01) |
| *B29L 31/34* | (2006.01) |

(52) U.S. Cl.

CPC .......... *B29C 45/2602* (2013.01); *B29C 45/12* (2013.01); *B29C 45/1756* (2013.01); *B29C 45/66* (2013.01); *G06F 1/1656* (2013.01); *B29L 2031/3481* (2013.01); *B29L 2031/737* (2013.01)

(58) Field of Classification Search

CPC ..... G06F 1/1613; G06F 1/1633; G06F 1/1656

See application file for complete search history.

(56) References Cited

U.S. PATENT DOCUMENTS 5,623,133 A * 4/1997 Kurihara ............ B29C 45/0046 181/150

5,642,755 A * 7/1997 Mark ........................ E03C 1/04 137/359

(Continued)

FOREIGN PATENT DOCUMENTS

CN 204259577 U 4/2015

CN 206527991 U 9/2017

(Continued)

OTHER PUBLICATIONS

Office Action issued by Taiwan Intellectual Property Office on Oct. 22, 2025.

(Continued)

*Primary Examiner* — Adrian S Wilson

(74) *Attorney, Agent, or Firm* — WPAT, PC

(57) ABSTRACT

A housing is provided. The housing includes a side wall having a plurality of holes and at least one reinforcing rib disposed on a surface of the side wall, wherein the holes are disposed on a side surface of the side wall, the at least one reinforcing rib extends along the edges of the holes, and the at least one reinforcing rib has a plurality of extending directions parallel to the surface, and the extending directions are different from each other. The side wall and the reinforcing rib are an integral structure, and the reinforcing rib does not cover the holes.

11 Claims, 10 Drawing Sheets

(56) References Cited

U.S. PATENT DOCUMENTS 5,820,191 A * 10/1998 Blakewood, Jr. ...... B60J 5/0416 296/146.7
6,102,501 A * 8/2000 Chen ....................... G06F 1/181 312/293.3
6,643,123 B2 * 11/2003 Hartel .................... H02B 1/565 361/678
7,334,692 B2 * 2/2008 Black ................... A47B 47/025 211/187
7,387,213 B1 * 6/2008 Smalley .................. A47F 5/101 211/106
7,508,663 B2 * 3/2009 Coglitore ........... H05K 7/20736 165/122
7,839,637 B2 * 11/2010 Pakravan ........... H05K 7/20572 165/122
8,315,052 B2 * 11/2012 Chan .................... H05K 7/1488 312/265.5
8,357,850 B2 * 1/2013 Ye ....................... B29C 45/1657 174/559
8,675,357 B2 * 3/2014 Namek ............. H05K 7/20745 361/692
8,863,671 B2 * 10/2014 Shaw ..................... B65D 19/38 108/56.3
9,658,656 B2 * 5/2017 Lu ......................... G06F 1/1656
9,756,765 B1 * 9/2017 Michaud ............. H05K 7/1488
9,848,255 B1 * 12/2017 Brown ................... H04R 1/023
10,004,163 B2 * 6/2018 Smith ................ H05K 7/20736
10,555,440 B2 * 2/2020 Bailey ................ H05K 7/20727
11,096,307 B2 * 8/2021 Sassano ............... H05K 5/0226
11,172,770 B2 * 11/2021 Nguyen ................ A47F 3/0469
D942,441 S * 2/2022 Akana .......................... D14/302
D1,035,642 S * 7/2024 Akana .......................... D14/444
12,065,344 B2 * 8/2024 Chen ......................... B66F 9/18
12,289,867 B2 * 4/2025 Elkins ................ H05K 7/20145
2007/0211439 A1 * 9/2007 Shimizu ............. H05K 7/20563 361/724
2009/0129014 A1 * 5/2009 Larsen ................... H05K 7/186 361/692
2009/0147464 A1 * 6/2009 Anderl ...................... G06F 1/20 361/679.46
2011/0069436 A1 * 3/2011 Jian ......................... G06F 1/181 361/679.02
2011/0310550 A1 * 12/2011 Xu ............................ G06F 1/20 361/679.48
2012/0134103 A1 * 5/2012 Tan .................... H05K 7/20736 312/236
2013/0050945 A1 * 2/2013 Diep ........................ H05K 5/15 361/752
2015/0036285 A1 * 2/2015 Lu .......................... H04R 1/023 361/679.55
2015/0060131 A1 * 3/2015 Coppola .............. H05K 9/0041 174/383
2022/0204331 A1 * 6/2022 Chen ......................... B66F 9/18
2023/0199985 A1 * 6/2023 Kim ..................... H01H 9/0235 361/752

FOREIGN PATENT DOCUMENTS

CN 207245159 U 4/2018
CN 108973038 A 12/2018
CN 208219603 U 12/2018
CN 114233691 A 3/2022
CN 115734529 A 3/2023
TW 311113 7/1997

OTHER PUBLICATIONS

Office Action issued by Taiwan Intellectual Property Office on Dec. 2, 2024.

* cited by examiner 30
102B
104s
308
108

HOUSING AND METHOD FOR MANUFACTURING THE SAME

This application claims the benefit of Taiwan application Serial No. 112142676, filed Nov. 6, 2023, the subject matter of which is incorporated herein by reference.

BACKGROUND OF THE INVENTION

The invention relates in general to a housing and a method for manufacturing the same, and more particularly to a housing having holes and a method for manufacturing the same.

DESCRIPTION OF THE RELATED ART

Housings are widely used, and various electronic products require the protection of housings. According to the needs of the product, some housings need to have holes. However, when the housing has holes, it becomes more difficult to increase the strength of the housing. Therefore, there is still an urgent need to study methods that can enhance the strength of housings having holes.

Generally speaking, the housing may include a main plane and a wall connected to the main plane. When the housing does not have a hole, the strength of the housing can be enhanced by one or more of the following three methods: increasing the thickness of the housing, adding support columns on the main plane, and adding bar-shaped reinforcing ribs on the wall.

However, when the housing has holes, some problems may arise if the above method is chosen. For example, when adopting the method of "increasing the thickness of the housing", it is necessary to consider the difference in the sizes of the inner side aperture and outer side aperture caused by the draft angle of the hole. As the housing becomes thicker, the difference in apertures becomes larger. That is to say, taking into account the spacing of the holes, the thickness of the housing is also limited when the draft angle is fixed. If the method of "adding support columns on the main plane" is adopted, you need to consider that the placement of support columns will sacrifice the layout space of internal components. If the method of "adding bar-shaped reinforcing ribs on the wall" is adopted, you need to consider the spacing between the holes. If the spacing between the holes is insufficient, the bar-shaped reinforcing ribs cannot be used, otherwise the holes will be blocked by the bar-shaped reinforcing ribs.

Therefore, the housing design of the present invention is to solve at least some of the above problems.

SUMMARY OF THE INVENTION

The invention is directed to a housing. The housing includes a reinforcing rib to strengthen the housing.

According to an embodiment of the present invention, a housing is provided. The housing includes a side wall having a plurality of holes and at least one reinforcing rib disposed on a surface of the side wall, wherein the holes are disposed on a side surface of the side wall, the at least one reinforcing rib extends along the edges of the holes, and the at least one reinforcing rib has a plurality of extending directions parallel to the surface, and the extending directions are different from each other. The side wall and the reinforcing rib are an integral structure, and the reinforcing rib does not cover the holes.

According to another embodiment of the present invention, a method for manufacturing a housing is provided. The method includes the following steps. Firstly, assembling a plurality of molds, wherein the molds comprises a male mold, a female mold, at least one slide and at least one lifter, wherein the male mold and the female mold are arranged oppositely, the lifter is adjacent to the male mold and is disposed on a same side of the female mold as the male mold, and the at least one slide is disposed on a side of the male mold and the female mold, and a cavity is formed between the male mold, the female mold, the at least one slide and the at least one lifter. Then, an injection material is injected into the cavity. Thereafter, demolding steps are performed after the injection material has cooled, wherein the demolding steps comprise exiting the female mold, exiting the at least one slide, exiting the male mold, and exiting the at least one lifter, wherein an exit direction of the at least one lifter is different from an exit direction of the male mold, and the at least one lifter is used to form at least one reinforcing rib.

The above and other aspects of the invention will become better understood with regard to the following detailed description of the preferred but non-limiting embodiment(s). The following description is made with reference to the accompanying drawings.

DETAILED DESCRIPTION OF THE INVENTION

According to some embodiments of the present invention, a reinforcing rib can be disposed on a side wall of a housing, and the reinforcing rib has a plurality of extending directions, that is, the shape of the reinforcing rib is not a straight line, and the problem of insufficient strength in the housing with holes can be solved.

Figure 1A:
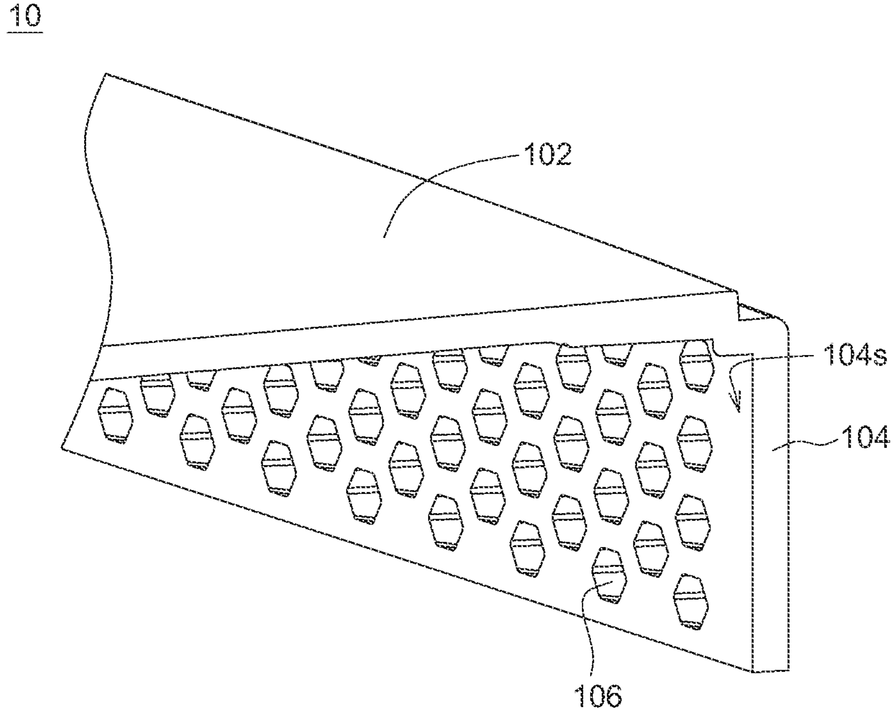
FIG. 1A shows a partial schematic view of a housing according to an embodiment of the present invention.
Figure 1B:
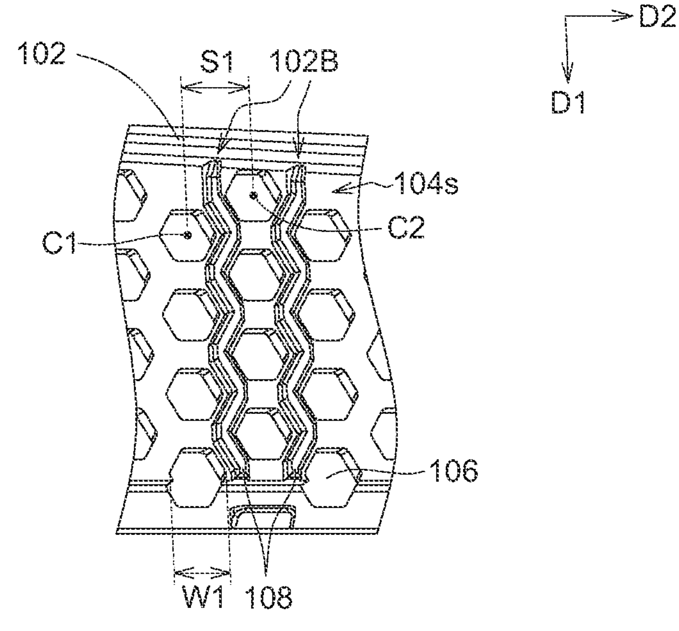
FIG. 1B shows a partial schematic view of the inside of the housing of FIG. 1A.
Figure 1C:
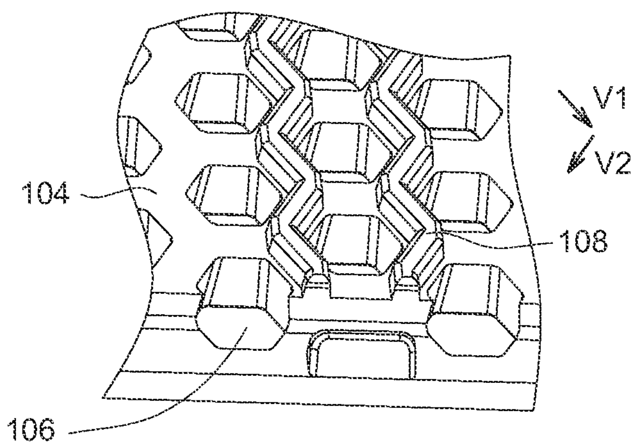
FIGS. 1C and 1D are schematic views of a housing according to an embodiment of the present invention from different perspective views than FIG. 1B.
Figure 1D:
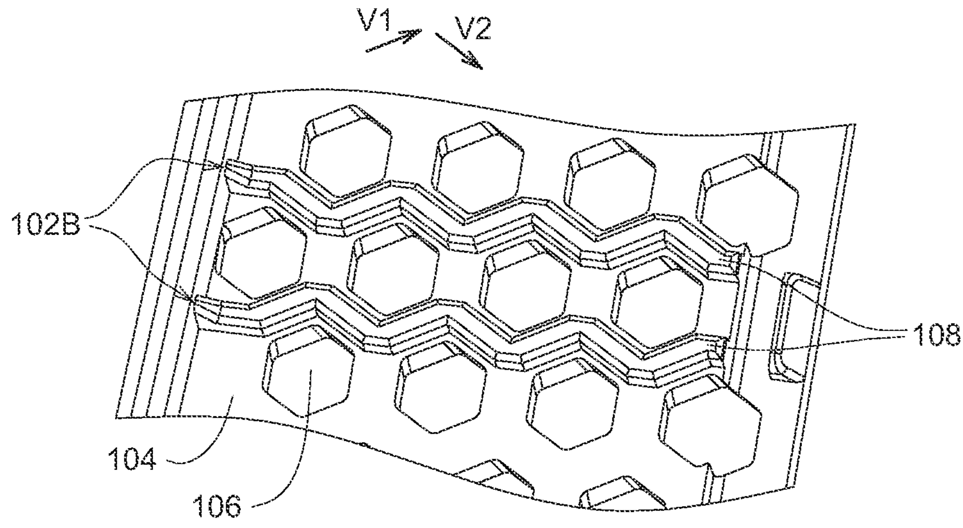
Figures 2A, 2B:
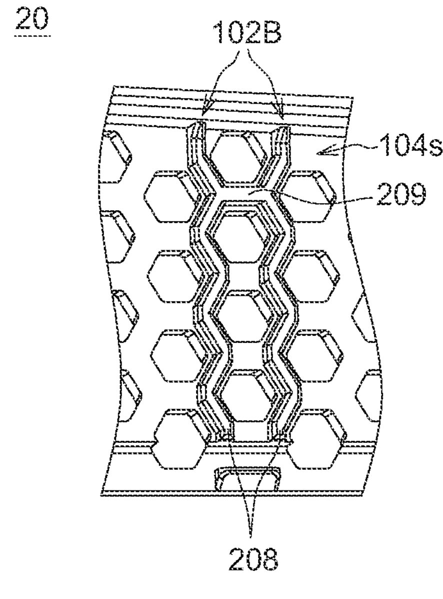
FIG. 2A shows a partial schematic view of a housing according to another embodiment of the present invention.
FIG. 2B shows a partial schematic view of a housing according to another embodiment of the present invention.

FIG. 1A shows a partial schematic view of a housing 10 according to an embodiment of the present invention, wherein reinforcing ribs 108 are omitted in FIG. 1A. FIG. 1B shows a partial schematic view of the inside of the housing 10 of FIG. 1A. FIGS. 1C and 1D are schematic views of the housing 10 according to an embodiment of the present invention from different perspective views than FIG. 1B. FIG. 2A shows a partial schematic view of a housing 20 according to another embodiment of the present invention. FIG. 2B shows a partial schematic view of a housing 30 according to another embodiment of the present invention.

As shown in FIG. 1A, the housing 10 includes a main plane 102 and a side wall 104. The side wall 104 has a plurality of holes 106 on the wall surface. The main plane 102 is connected to the side wall 104. In the present embodiment, an included angle formed between the main plane 102 and the side wall 104 is 90 degrees, but the invention is not limited thereto.

Referring to FIGS. 1A to 1D at the same time, the housing 10 also includes reinforcing ribs 108. The reinforcing ribs 108 are provided on a surface 104*s* of the side wall 104. The surface 104*s* is, for example, an inner surface of the side wall 104. Furthermore, the reinforcing ribs 108 are connected to the main plane 102, for example, connected to a root 102B of the main plane 102, to enhance the strength of the housing 10. The reinforcing ribs 108 extend around the holes 106. For example, the reinforcing ribs 108 extend continuously from the root 102B of the main plane 102 along the edges of the holes 106, and the reinforcing ribs 108 have a plurality of extending directions V1 and V2 parallel to the surface 104*s*. The extending directions V1 and V2 are different from each other. In other words, the reinforcing ribs 108 extend along the edges of the holes 106, so the appearance of the reinforcing ribs 108 is not a straight line and has an appearance corresponding to the holes 106. Furthermore, the reinforcing ribs 108 do not cover the holes 106.

In the present embodiment, the shapes of the holes 106 are all the same. However, the present invention is not limited thereto. The shapes of the holes 106 can be different from each other, such as a combination of various geometric shapes.

As shown in FIG. 1C, there is no boundary between the side wall 104 and the reinforcing ribs 108, and the side wall 104 and the reinforcing ribs 108 are an integral structure. Furthermore, the entire housing 10 (including the main plane 102, the side wall 104 and the reinforcing ribs 108) can be an integral structure. For example, the main plane 102, the side wall 104 and the reinforcing ribs 108 can be formed simultaneously through the same process (such as an injection molding process).

Referring to FIG. 1B, in the present embodiment, the housing 10 has a first direction D1 and a second direction D2 parallel to the surface 104*s* of the side wall 104, and the holes 106 are disposed in columns in the first direction D1. The center points C1 of the odd-numbered columns of holes 106 are separated from the center points C2 of the even-numbered columns of holes 106 in the second direction D2, and the first direction D1 is different from the second direction D2. The angle between the first direction D1 and the second direction D2 is, for example, 90 degrees, but the invention is not limited thereto. In other words, the center points of the holes 106 in the same column are aligned with each other in the first direction D1, while the holes 106 in the odd-numbered columns and the holes 106 in the even-numbered columns are not aligned with each other in the second direction D2, but are staggered from each other. The holes 106 are arranged like a honeycomb pattern. It should be understood that the arrangement of the holes 106 of the present invention is not limited thereto. In the present embodiment, the first direction D1 is parallel to a normal direction of the main plane 102, but the invention is not limited thereto.

According to an embodiment, there is a spacing S1 between the center points C1 and C2 of the two adjacent columns of holes 106 in the second direction D2, and the spacing S1 is smaller than a width W1 of the hole 106 in the second direction D2, as shown in FIG. 1B.

In the embodiment of FIGS. 1A to 1D, adjacent reinforcing ribs 108 are separated from each other and are not connected to each other. In other embodiments, as shown in FIG. 2A, in the housing 20, adjacent reinforcing ribs 208 can be connected to each other through a transverse strip 209. The number of transverse strip 209 may be one or more. Similarly, the side wall 104, the reinforcing ribs 208 and the transverse strip 209 can be an integral structure. The arrangement of the transverse strip 209 helps to further enhance the strength of the housing 20.

In the embodiment of FIGS. 1A to 1D, the reinforcing ribs 108 extend along the edges of all of the holes 106 in the same column. In other embodiments, the reinforcing ribs 308 may extend to the edges of some of the holes 106. As shown in FIG. 2B, in the housing 30, the reinforcing rib 308 does not extend to the last hole 106 of the same column, that is, the reinforcing rib 308 does not extend to the last hole 106 in the same column. After the reinforcing rib 308 extends from the root of the main plane 102, it stops at the edge of the penultimate hole 106. Therefore, the extending lengths of the reinforcing ribs 108 and 308 may be different from each other. In the above embodiment, only four holes 106 are shown in the same column, but the invention is not limited thereto.

Figure 3A:
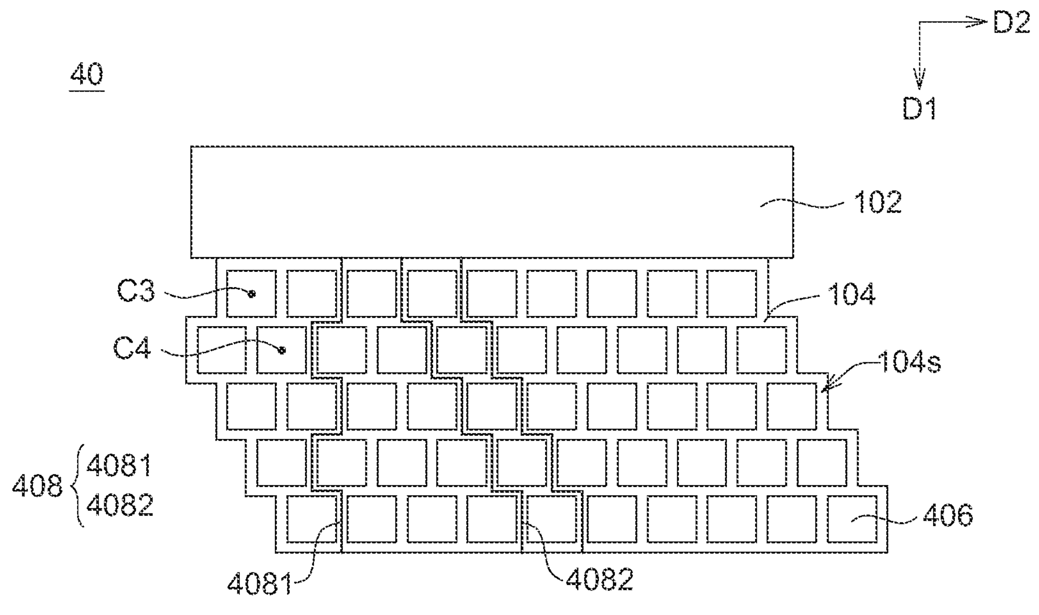
FIG. 3A shows a partial schematic view of a housing according to another embodiment of the present invention.
Figure 3B:
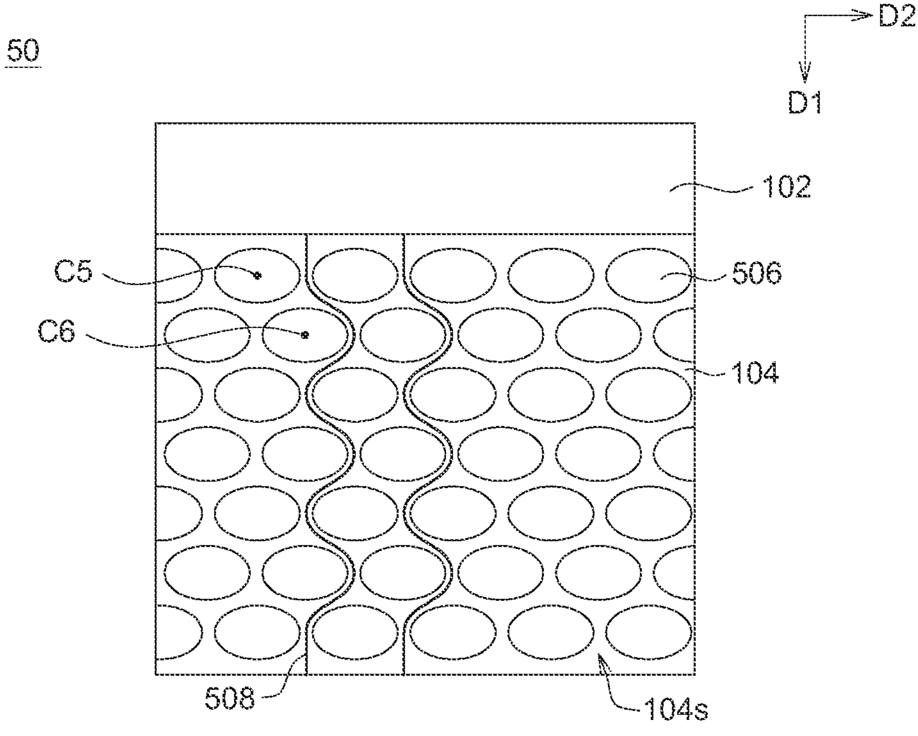
FIG. 3B shows a partial schematic view of a housing according to another embodiment of the present invention.

In the above embodiment, the shape of the hole 106 is hexagonal, but the invention is not limited thereto. The hole 106 can be any geometric figure, such as a circle, an ellipse, a triangle, a rectangle or other geometric figures. For embodiments with rectangular and elliptical holes, please refer to FIGS. 3A and 3B respectively. FIG. 3A shows a partial schematic diagram of the housing 40 according to a further embodiment of the present invention. FIG. 3B shows a partial schematic diagram of the housing 50 according to a further embodiment of the present invention.

As shown in FIG. 3A, in the housing 40, the holes 406 may be rectangular. In the present embodiment, the holes 406 are arranged in rows in the second direction D2, wherein the center points C3 of the holes 406 in the odd-numbered rows and the center points C4 of the holes 406 in the even-numbered rows are separated in the first direction D1. In other words, the center points of the holes 406 in the same row are aligned with each other in the second direction D2, but the holes 406 in the odd-numbered rows and the holes 406 in the even-numbered rows are not aligned with each other in the first direction D1. As mentioned above, the first direction D1 and the second direction D2 are parallel to the surface 104*s* of the side wall 104. The first direction D1 is different from the second direction D2. The angle between the first direction D1 and the second direction D2 is, for example, 90 degrees, but the invention is not limited thereto. In FIG. 3A, the reinforcing ribs 408 include a first reinforcing rib 4081 and a second reinforcing rib 4082. The first reinforcing rib 4081 and the second reinforcing rib 4082 are connected to the root of the main plane 102 and have different extension trajectories. In other embodiments, the extension trajectories of the first reinforcing rib 4081 and the second reinforcing rib 4082 can also be the same. It should be understood that the extension trajectories of the reinforcing ribs 408 are not limited thereto. As long as the reinforcing ribs 408 are connected to the root of the main plane 102 and extend around the holes 406, they are within the scope of protection of the present invention.

As shown in FIG. 3B, in the housing 50, the holes 506 may be elliptical. In the present embodiment, the holes 506 are arranged in rows in the second direction D2, wherein the center points C5 of the holes 506 in the odd-numbered rows and the center points C6 of the holes 506 in the even-numbered rows are separated in the first direction D1. In other words, the center points of the holes 506 in the same row are aligned with each other in the second direction D2, but the holes 506 in the odd-numbered rows and the holes 506 in the even-numbered rows are not aligned with each other in the first direction D1. As mentioned above, the first direction D1 and the second direction D2 are parallel to the surface 104*s* of the side wall 104. The first direction D1 is different from the second direction D2. The angle between the first direction D1 and the second direction D2 is, for example, 90 degrees, but the invention is not limited thereto. Similarly, the reinforcing ribs 508 are connected to the root 102B of the main plane 102 and extend continuously from the root 102B of the main plane 102 along the edges of the holes 506.

Figure 4A:
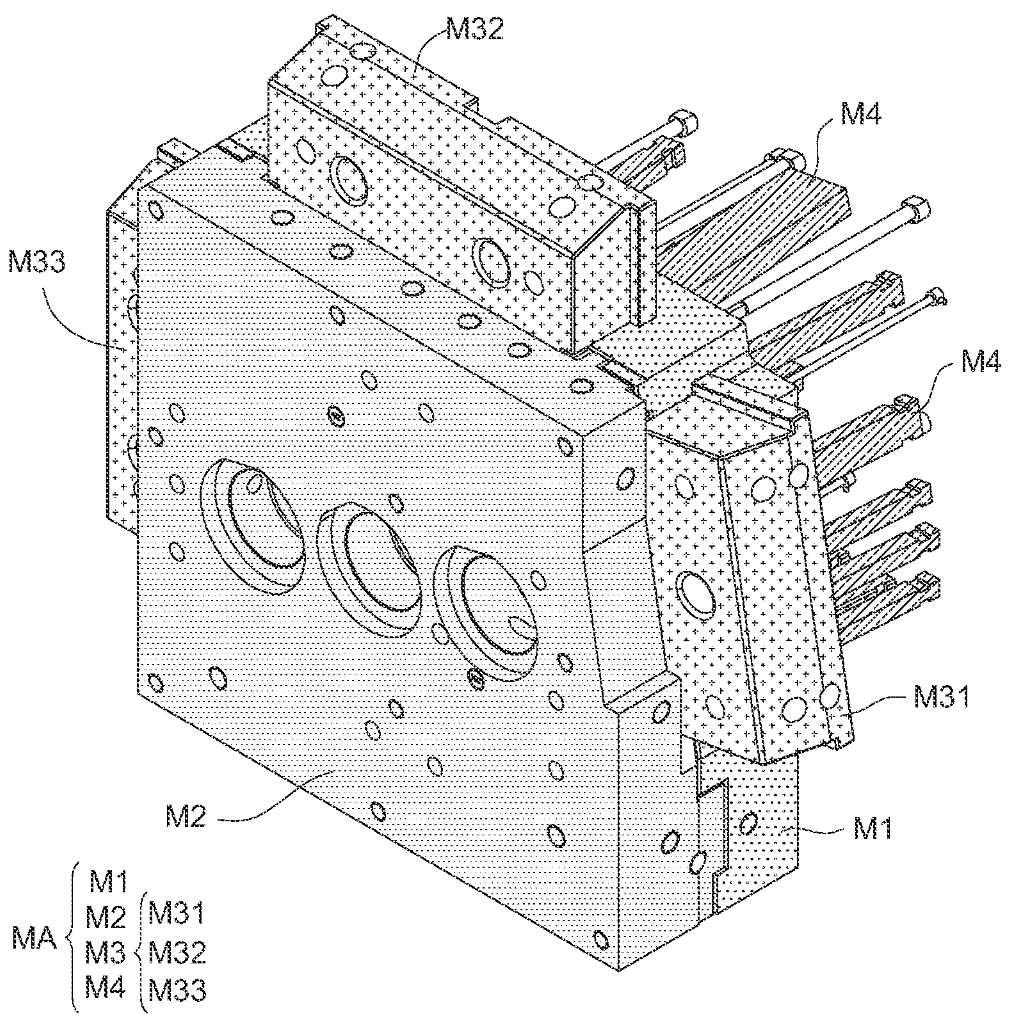
FIGS. 4A to 8 illustrate a method for manufacturing a housing according to an embodiment of the present invention.

FIGS. 4A to 8 illustrate a method for manufacturing the housing 10 according to an embodiment of the present invention. The manufacturing method is as follows. First, assemble the molds MA. FIG. 4A shows the assembled state of the molds MA. FIG. 4B shows a partial schematic diagram of a region corresponding to the formation of the reinforcing ribs 108. Please refer to FIGS. 4A and 4B at the same time. The molds MA include a male mold M1, a female mold M2, a plurality of slides M3 and a plurality of lifters M4. The male mold M1 and the female mold M2 are arranged oppositely. The lifters M4 are adjacent to the male mold M1 and are disposed on the same side of the female mold M2 as the male mold M1, and the slides M3 are disposed on sides of the male mold M1 and the female mold M2. A cavity is formed between the male mold M1, the female mold M2, the slides M3 and the lifters M4. The cavity is a space used to form the housing 10, that is, the gap between the male mold M1, the female mold M2, the slides M3 and the lifters M4 is the space where the housing 10 is formed. The slides M3 are mainly used to form the holes 106, and the lifters M4 are mainly used to form the reinforcing ribs 108. In the present embodiment, the slides M3 include slides M31-M33, and the slides M31-M33 are respectively used to form the holes 106 on different side walls 104 of the housing 10.

Figure 4B:
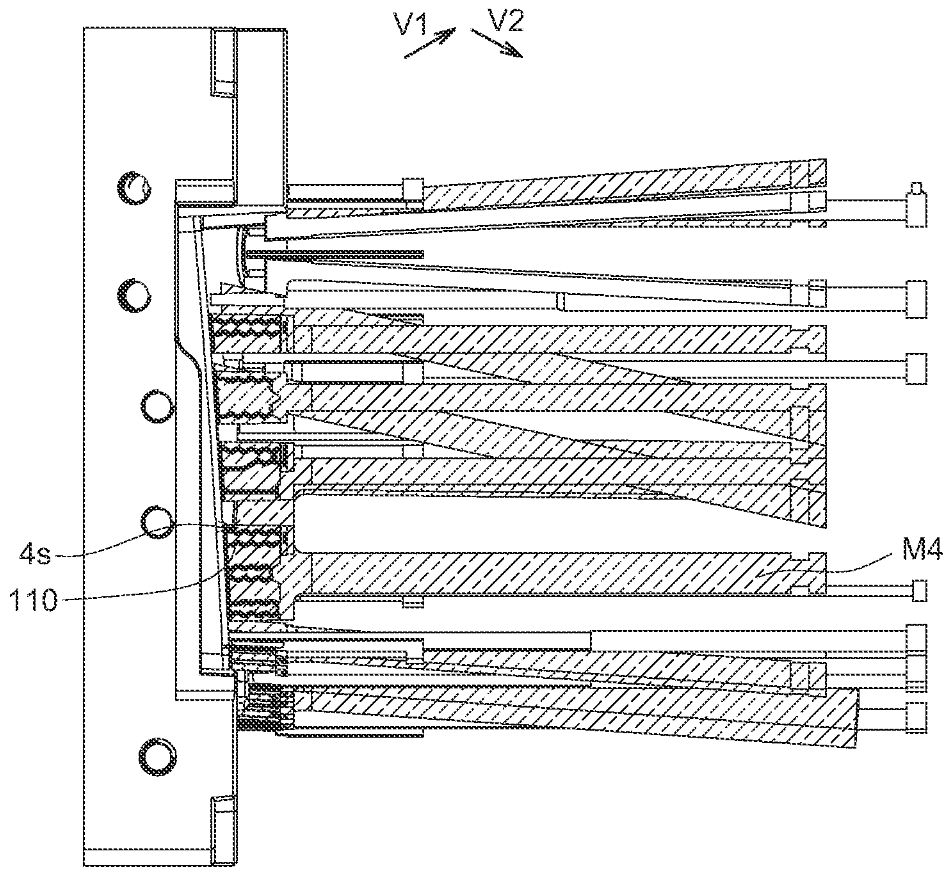

As shown in FIG. 4B, side surfaces 4*s* of the lifters M4 have a plurality of grooves 110. The grooves 110 have a plurality of extending directions (for example, V1 and V2) parallel to the side surfaces 4*s*. These extending directions (for example, V1 and V2) are different from each other and correspond to the reinforcing ribs 108 of the housing 10. The side surface 4*s* marked here refers to the side surface 4*s* of the lifter M4 corresponding to and adjacent to the slide M31.

Figure 5:
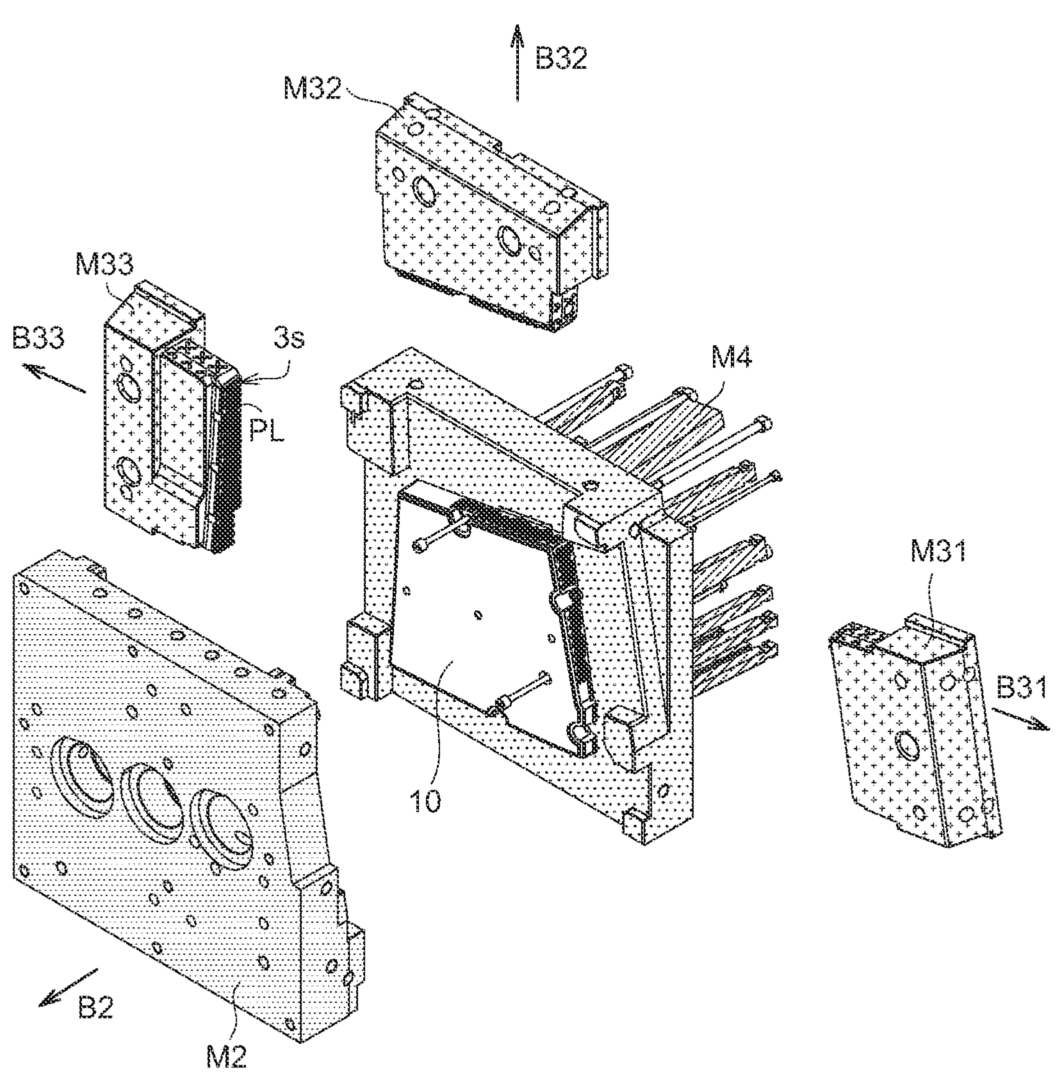
Figure 6:
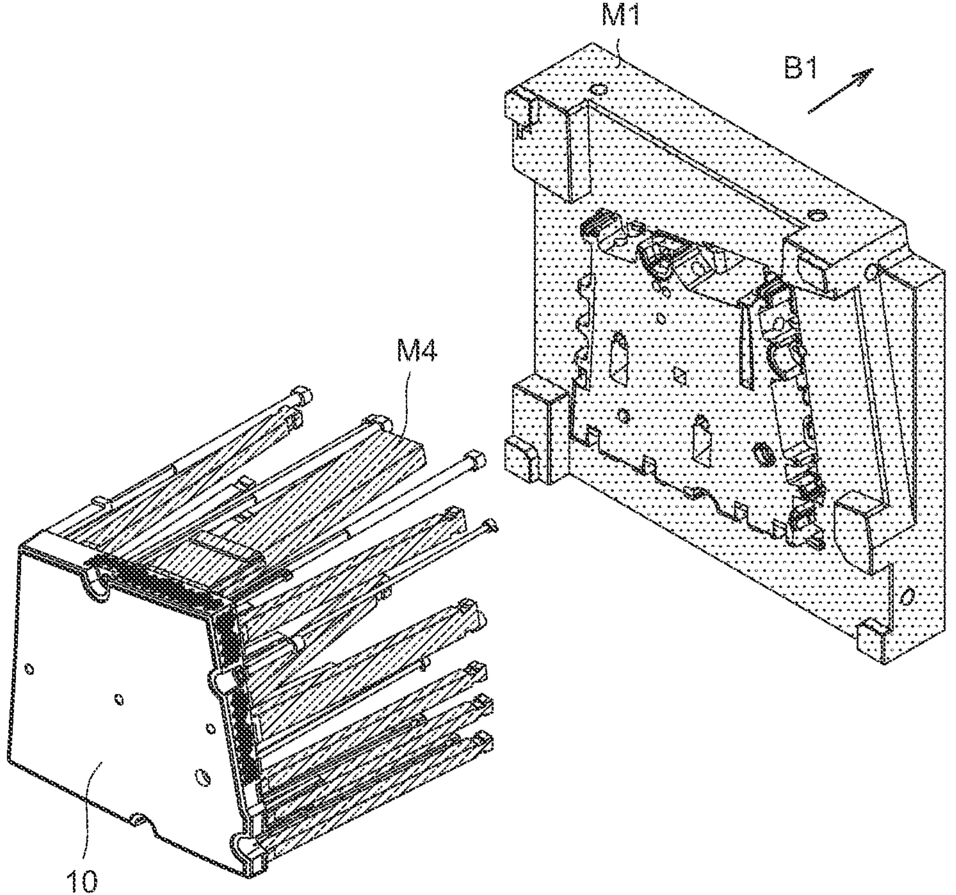
Figure 7:
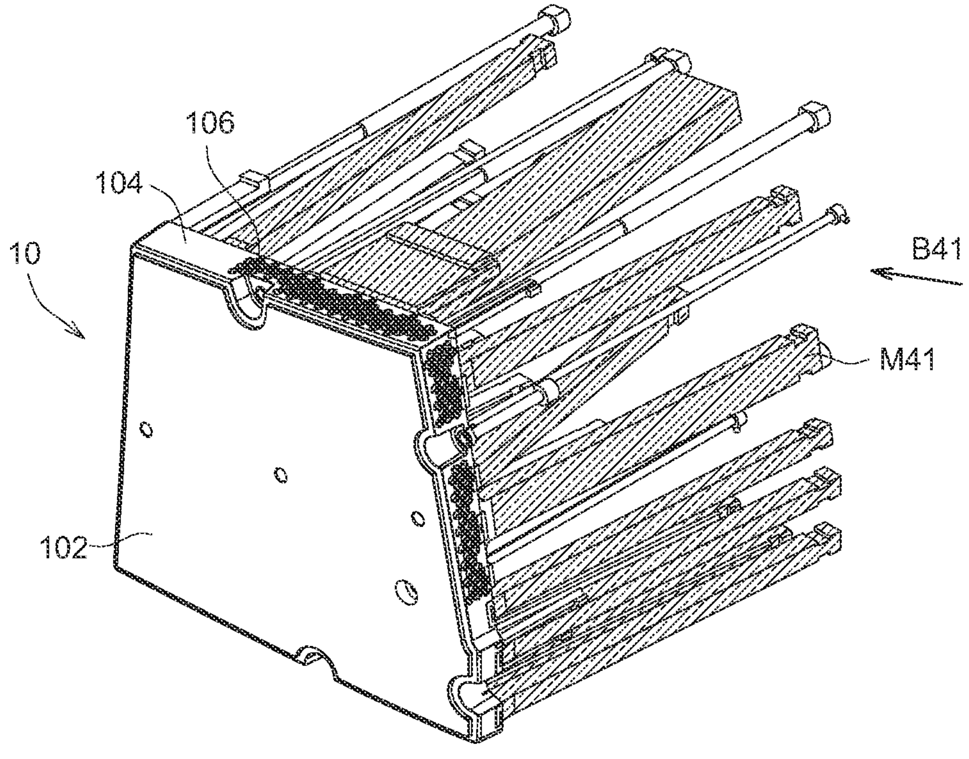

After the step of assembling the molds MA is completed, the injection material is injected into the cavity. In the present embodiment, the injection material is, for example, a plastic material. However, the invention is not limited thereto. The injection material may be a metal material or other materials suitable for injection molding. After the injection material has cooled, demolding steps are performed, as shown in FIGS. 5 to 7. Among them, the demolding steps include: exiting the female mold M2 and the slides M3 (as shown in FIG. 5), exiting the male mold M1 (as shown in FIG. 6), and exiting the lifters M4 (as shown in FIG. 7).

Referring to FIG. 5, the exit direction B2 of the female mold M2 is, for example, parallel to the side surface 4*s* of the lifter M4. The exit directions B31-B33 of the slides M31-M33 can be different from each other. For example, the exit direction B31 of the slide M31 can be parallel to the normal direction of the side surface 4*s* of the lifter M4 adjacent to the slide M31. The exit direction B32 of the slide M32 can be parallel to the normal direction of the side surface 4*s* of the lifter M4 adjacent to the slide M32. The exit direction B33 of the slide M33 can be parallel to the normal direction of the side surface 4*s* of the lifter M4 adjacent to the slide M33. The exit direction B31 and the exit direction B33 may be opposite to each other. The slide M33 has an inner surface 3*s*, which is adjacent to the housing 10 (before the injection material is injected, the inner surface 3*s* is adjacent to the cavity used to form the housing 10). A plurality of protruding pillars PL are provided on the inner surface 3*s*, and the protruding directions of the protruding pillars PL are parallel to the normal direction of the inner surface 3*s*. That is, the protruding pillars PL protrude inwardly from the inner surface 3*s* to form the holes 106 in the housing 10. The exit directions B31-B33 of the slides M31-M33 may be parallel to the normal directions of the respective inner surfaces 3*s* of the slides M31-M33, respectively.

Please refer to FIG. 6. After the step of exiting the female mold M2 and the slide M3 (that is, the step as shown in FIG. 5) is completed, exit the male mold M1. The exit direction B1 of the male mold M1 may be parallel to the side surface 4*s* of the lifter M4. Furthermore, the exit direction B1 of the male mold M1 may be opposite to the exit direction B2 of the female mold M2.

Please refer to FIG. 7. After the step of exiting the male mold M1 (that is, the step as shown in FIG. 6) is completed, exit the lifters M4. The exit direction of the lifter M4 is different from the exit direction of the male mold M1. For example, the exit direction of one of the lifters M41 includes a lateral exit direction B41, and the lateral exit direction B41 is parallel to the normal direction of the side surface 4*s* of the lifter M4. The lateral exit direction B41 is, for example, perpendicular to the exit direction B1 of the male mold M1, but the invention is not limited thereto. The side surface 4*s* of the lifter M4 may be parallel to the corresponding surface 104*s* of the side wall 104 of the housing 10.

Since the housing 10 has reinforcing ribs 108, the reinforcing ribs 108 protrude toward the interior of the housing 10, and the protruding direction of the reinforcing ribs 108 intersects (for example, is perpendicular to) the demolding directions (i.e., exit directions) of the male mold M1 and the female mold M2, so the reinforcing ribs 108 cannot be formed only by the male mold M1 and the female mold M2, but needs to be demolded by using the lifters M4 to rotate inwardly.

Figure 8:
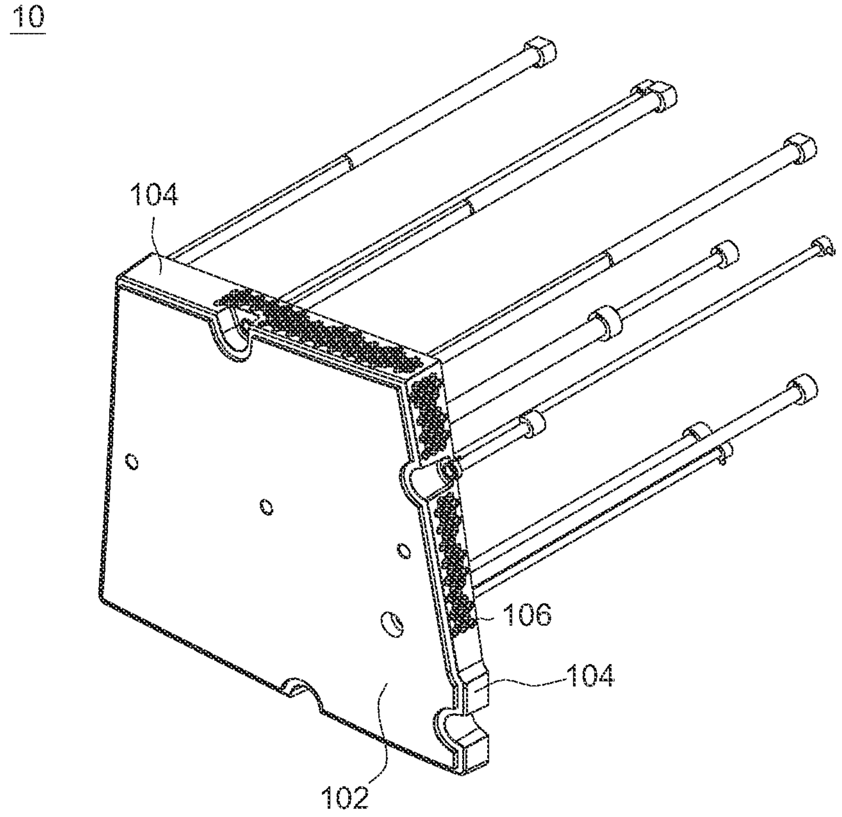

Please refer to FIG. 8. After completing the steps of exiting the lifters M4, the manufacturing steps of the housing 10 are completed. The housing 10 includes a main plane 102 and a side wall 104 connected to the main plane 102. The side wall 104 has a plurality of holes 106, and reinforcing ribs 108 (not shown in FIG. 8) are formed on the surface 104*s* (such as the inner surface). For other structural descriptions of the housing 10, please refer to the contents of the housing 10 in FIGS. 1A to 1D, and structural descriptions of the housing 10 will not be described in detail here. It should be understood that features of different embodiments of the present invention can be combined with each other according to design requirements.

According to one embodiment of the present invention, a housing is provided. The housing includes a side wall having a plurality of holes and at least one reinforcing rib disposed on a surface of the side wall, wherein the holes are disposed on a surface of the side wall, the reinforcing rib extends along the edges of the holes, and the reinforcing rib has a plurality of extending directions parallel to the surface, and the extending directions are different from each other. The side wall and the reinforcing rib are an integral structure, and the reinforcing rib does not cover the holes.

Through the design of the reinforcing rib in the invention, there is no need to increase the thickness of the housing itself, and there is no need to add additional support columns. Moreover, since the reinforcing rib in the invention has extending directions parallel to the surface of the side wall and in different directions, even if the spacing between the holes is quite small, there is no need to worry about blocking the holes. Therefore, the design of the reinforcing rib in the invention can provide sufficient reinforcement for the housing with holes, which can improve the overall structural strength and prevent the housing and its interior electronic components from being damaged by external forces.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A housing, comprising:

a side wall having a plurality of holes;

at least one reinforcing rib disposed on a surface of the side wall, wherein the holes are disposed on a side surface of the side wall, the at least one reinforcing rib extends along edges of the holes, and the at least one reinforcing rib has a plurality of extending directions parallel to the surface, and the extending directions are different from each other, wherein the side wall and the at least one reinforcing rib are an integral structure, and the at least one reinforcing rib does not cover the holes; and a main plane connected to the side wall, wherein the at least one reinforcing rib is physically connected to the main plane, and a portion of a hole in the holes facing the main plane is exposed from the at least one reinforcing rib.

2. The housing according to claim 1, wherein the at least one reinforcing rib has a shape corresponding to the holes.

3. The housing according to claim 1, wherein the holes are disposed in columns arranged in a first direction and sequentially numbered along a second direction, center points of odd-numbered columns of the holes are staggered from center points of even-numbered columns of the holes in the second direction, and the first direction is different from the second direction.

4. The housing according to claim 1, wherein the housing has a first direction and a second direction parallel to the surface of the side wall, the holes are disposed in rows arranged in the second direction and sequentially numbered along the first direction, center points of odd-numbered rows of the holes are staggered from center points of even-numbered rows of holes in the first direction, and the first direction is different from the second direction.

5. The housing according to claim 1, wherein a number of the at least one reinforcing rib is plural, and the reinforcing ribs have different extending lengths.

6. The housing according to claim 1, wherein the holes have shapes of a circle, an ellipse, a triangle, a rectangle or other geometric figures.

7. The housing according to claim 1, wherein the shapes of the holes are the same.

8. The housing according to claim 1, wherein the shapes of the holes are different from each other.

9. The housing according to claim 1, wherein the at least one reinforcing rib is connected to a root of the main plane.

10. The housing according to claim 1, wherein a number of the at least one reinforcing rib is plural, and adjacent ones of the reinforcing ribs are connected to each other.

11. The housing according to claim 1, wherein a number of the at least one reinforcing rib is plural, and adjacent ones of the reinforcing ribs are separated from each other.

* * * * *